United States Patent
Fang et al.

(10) Patent No.: US 12,326,636 B2
(45) Date of Patent: Jun. 10, 2025

(54) DIMMING WINDOW COMPRISING A TRANSPARENT CONDUCTIVE LAYER HAVING A BONDING REGION AND METHOD FOR MANUFACTURING THE SAME

(71) Applicants: Hefei BOE Display Technology Co., Ltd., Anhui (CN); BOE Technology Group Co., Ltd., Beijing (CN)

(72) Inventors: Yunhua Fang, Beijing (CN); Zhu Qiao, Beijing (CN); Kai Wang, Beijing (CN); Yajun Li, Beijing (CN); Jian Hu, Beijing (CN); Hang Li, Beijing (CN); Hongxiang Xu, Beijing (CN); Chenchen Di, Beijing (CN); Yueming Chen, Beijing (CN); Chunpu Wu, Beijing (CN); Heng Zhang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/762,006

(22) PCT Filed: Apr. 23, 2021

(86) PCT No.: PCT/CN2021/089210
§ 371 (c)(1),
(2) Date: Mar. 18, 2022

(87) PCT Pub. No.: WO2022/222129
PCT Pub. Date: Oct. 27, 2022

(65) Prior Publication Data
US 2024/0295780 A1 Sep. 5, 2024

(51) Int. Cl.
*G02F 1/1345* (2006.01)
*G02F 1/1335* (2006.01)

(52) U.S. Cl.
CPC .... *G02F 1/13452* (2013.01); *G02F 1/133516* (2013.01)

(58) Field of Classification Search
CPC ........... G02F 1/13475; G02F 2202/043; G02F 1/13756; G02F 2203/48; G02F 1/133557
See application file for complete search history.

(56) References Cited

U.S. PATENT DOCUMENTS

2016/0291429 A1 10/2016 Peng et al.
2017/0336675 A1* 11/2017 Kim ................... G02F 1/13725
2021/0247636 A1* 8/2021 Xiao .................. G02F 1/13475

FOREIGN PATENT DOCUMENTS

CN 104793362 A 7/2015
CN 106501981 A * 3/2017 ........... G02F 1/1333
(Continued)

*Primary Examiner* — Paul C Lee
(74) *Attorney, Agent, or Firm* — IPro, PLLC

(57) ABSTRACT

The present disclosure provides a dimming window and a method for manufacturing the same. The dimming window includes a cell defined by a first substrate and a second substrate, where at least one side edge of the first substrate exceeds an outside of the second substrate, and a part of the first substrate that exceeds the second substrate serves as a single substrate region; a first transparent conductive layer on one side of the first substrate facing the second substrate; a second transparent conductive layer on one side of the second substrate facing the first substrate; and a liquid crystal layer between the first substrate and the second substrate. The first transparent conductive layer includes a bonding region at the single substrate region; and a pattern of the bonding region includes a first sub-region and a second sub-region which are separated from each other; the first sub-region is in a binding connection with a first driving circuit which drives the first substrate, and the (Continued)

second sub-region is in a binding connection with a second driving circuit which drives the second substrate; and the second sub-region is in conductive connection with the second transparent conductive layer. The dimming window and the method for manufacturing the same in the present disclosure can eliminate the need to drill holes in substrates, reduce process difficulty, reduce time consumption and improve product yield.

14 Claims, 3 Drawing Sheets

(56) References Cited

FOREIGN PATENT DOCUMENTS

| | | | |
|---|---|---|---|
| CN | 111983863 A | | 11/2020 |
| CN | 212341650 U | * | 1/2021 |
| WO | 2019148165 A1 | | 8/2019 |

* cited by examiner

DIMMING WINDOW COMPRISING A TRANSPARENT CONDUCTIVE LAYER HAVING A BONDING REGION AND METHOD FOR MANUFACTURING THE SAME

CROSS-REFERENCE TO RELATED APPLICATIONS

The present application is the U.S. national phase of PCT Application No. PCT/CN2021/089210 filed on Apr. 23, 2021, which is incorporated herein by reference in its entirety.

TECHNICAL FIELD

The present disclosure relates to the field of displaying technologies, and in particular to a dimming window and a method for manufacturing the same.

BACKGROUND

In the related art, a smart dimming window is an electronic light-control product, including dimming windows in the form of electron capture detector (ECD), polymer dispersed liquid crystal (PDLC), etc. Typical applications of the smart dimming window are glass partitions, such as hotel partition, office partition, bathroom partition, bank window partition, ticket hall window partition. The smart dimming window is beautiful and can protect privacy, and has various functions such as waterproof, heat insulation, dimming. The smart dimming window is also used in villa window glass, car window glass and door glass of a wine cabinet, a bookcase, or a vending cabinet, to control light entry and privacy. Taking the PDLC smart dimming window as an example, the principle of a dye liquid crystal smart dimming window in vertical alignment (VA) mode is to cure dye liquid crystal containing chiral agent between two transparent conductive films (such as ITO), and use the upper and lower transparent conductive films to drive the dye liquid crystal to achieve light and dark changes.

Since the smart dimming window only involves two display forms of bright and dark gray scales and has no specific pixel unit, in order to adapt to a series of products with various dimensions, shapes and sizes, an entire substrate is covered with a transparent conductive film layer, without designing a mask for the transparent conductive film layer separately. In addition, with regard to the matter of bonding of a driving circuit, one method adopted in the related art is that when designing an external circuit, sizes of an array substrate and a color filter substrate are consistent, and there is no reserved pad edge; and when cutting a substrate, an avoidance hole needs to be defined in the array substrate and the color filter substrate, respectively, where the avoidance hole in the array substrate is used for avoiding a circuit bonding structure on the color filter substrate; and the avoidance hole in the color filter substrate is used for avoiding a circuit bonding structure on the array substrate. With such a structure, it is difficult to drill holes in the two substrates and there is no corresponding devices, thus, manual drilling is often used, which takes a long time and has a high breakage rate.

SUMMARY

Embodiments of the present disclosure provide a dimming window and a method for manufacturing the same, which eliminates the need to drill holes in substrates, reduces process difficulty, reduces process time and improves yield.

The technical solutions provided in embodiments of the present disclosure are as follows.

The embodiments of the present disclosure provide a dimming window, including: a cell defined by a first substrate and a second substrate, wherein at least one side edge of the first substrate exceeds an outside of the second substrate, and a part of the first substrate that exceeds the second substrate serves as a single substrate region: a first transparent conductive layer on one side of the first substrate facing the second substrate; a second transparent conductive layer on one side of the second substrate facing the first substrate; and a liquid crystal layer between the first substrate and the second substrate. The first transparent conductive layer includes a bonding region at the single substrate region; and a pattern of the bonding region includes a first sub-region and a second sub-region which are separated from each other. The first sub-region is in a binding connection with a first driving circuit which drives the first substrate, and the second sub-region is in a binding connection with a second driving circuit which drives the second substrate; and the second sub-region is in conductive connection with the second transparent conductive layer.

In some exemplary embodiments, the first substrate is an array substrate, and the second substrate is a color filter substrate.

In some exemplary embodiments, the second sub-region is in conductive connection with the second transparent conductive layer via conductive adhesive.

In some exemplary embodiments, the first transparent conductive layer includes a liquid crystal driving region: the liquid crystal driving region is at a region completely coincident with an orthographic projection of the second transparent conductive layer onto the first substrate: the liquid crystal driving region is an entire film layer covering the first substrate; and the first sub-region is an extension portion of the liquid crystal driving region and is in the same layer and made of the same material as the liquid crystal driving region.

In some exemplary embodiments, the pattern of the bonding region further includes a first separation line between the second sub-region and the first sub-region, and a second separation line between the second sub-region and the liquid crystal driving region.

In some exemplary embodiments, the first separation line and the second separation line are perpendicular to each other.

In some exemplary embodiments, the first separation line and the second separation line are both laser etching lines.

In some exemplary embodiments, the dimming window further includes a sealant between the first substrate and the second substrate; the sealant surrounds an outer periphery of the liquid crystal layer; and the bonding region is located at an outer side of the sealant away from the liquid crystal layer.

In some exemplary embodiments, the liquid crystal layer includes dye liquid crystal.

The embodiments of the present disclosure provide a method for manufacturing the above dimming window, including: manufacturing a first substrate; wherein at least one side edge of the first substrate exceeds a second substrate to form a single substrate region, a first transparent conductive layer is formed on one side of the first substrate facing the second substrate, the first transparent conductive layer includes a bonding region located at the single substrate region, and a pattern of the bonding region includes a first sub-region and a second sub-region which are separated from each other: the first sub-region is in a binding connection with a first driving circuit for driving the first substrate, and the second sub-region is in a binding connection with a second driving circuit for driving the second substrate; manufacturing the second substrate: wherein a second transparent conductive layer is formed on one side of the second substrate facing the first substrate; and assembling the first substrate and the second substrate to define a cell with the second sub-region in conductive connection with the second transparent conductive layer.

In some exemplary embodiments, the manufacturing the first substrate, includes: obtaining a first base substrate of the first substrate via cutting, wherein the first base substrate has the single substrate region that exceeds beyond the second substrate: forming a first conductive film on the first substrate; and patterning the first conductive film to form the first transparent conductive layer.

In some exemplary embodiments, the patterning the first conductive film to form the first transparent conductive layer, includes: patterning the first conductive film via laser etching.

In some exemplary embodiments, the assembling the first substrate and the second substrate to define the cell with the second sub-region in conductive connection with the second transparent conductive layer, includes: printing conductive adhesive on the second sub-region on the first substrate, so that the second sub-region is in conductive connection with the second transparent conductive layer via the conductive adhesive.

Advantageous effects brought about by embodiments of the present disclosure are as follows.

According to the dimming window and the method for manufacturing the same provided in embodiments of the present disclosure, a size after cutting of the first substrate is designed to be greater than a size after cutting of the second substrate, so that at least one side edge of the first substrate exceeds the second substrate, and is formed as the single substrate area. A part of the first transparent conductive layer covers the single substrate area, and this part serves as the bonding area for bonding and connecting a driving circuit. The bonding region is patterned to be divided into a first sub-region and a second sub-region which are separated from each other. The first sub-region is connected to the first transparent conductive layer and is bound and connected to the driving circuit of the first substrate. The second sub-region is bound and connected to the driving circuit of the second substrate. The second sub-region is in conduction with the second transparent conductive layer on the second substrate. In this way, the two substrates can be simultaneously driven by the bonding region separately provided on the first substrate. Therefore, by the presence of the single substrate region (i.e., a pad edge) protruding outside the second substrate on at least one side of the first substrate, the dimming window and the method for manufacturing the same provided in embodiments of the present disclosure can eliminate the need for drilling holes to avoid bonding circuits, thereby reducing process difficulty, reducing process time consumption and improving the product yield.

DETAILED DESCRIPTION

In order to make objects, technical solutions and advantages of the present disclosure more apparent, the technical solutions of embodiments of the present disclosure will be described hereinafter in a clear and complete manner in conjunction with the drawings of the embodiments. Obviously, the described embodiments are merely a part of, rather than all of, the embodiments of the present disclosure, and based on these embodiments, a person skilled in the art may obtain the other embodiments without inventive effort, which also fall within the scope of the present disclosure.

Unless otherwise defined, any technical or scientific terms used herein shall have the common meaning understood by a person of ordinary skills. Such words as "first" and "second" used in the present disclosure are merely used to differentiate different components rather than to represent any order, number or importance. Similarly, such words as "one", "a", or "the" are merely used to represent the existence of at least one member, rather than to limit the number thereof. Such words as "including", "includes" or the like mean that, an element or item preceding the word is intended to cover the element, or item, or equivalents thereof, which is listed after the word, instead of excluding other elements or items. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

Before describing in details a dimming window and a method for manufacturing the same according to embodiments of the present disclosure, it is necessary to describe the related art as follows.

Figure 1:
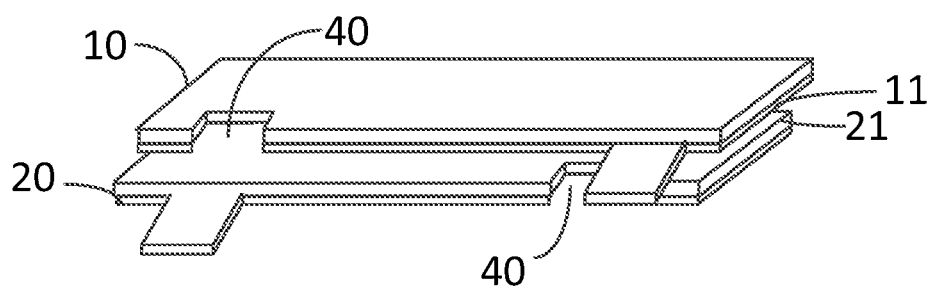
FIG. 1 is a schematic perspective view of a dimming window in the related art.
Figure 2:
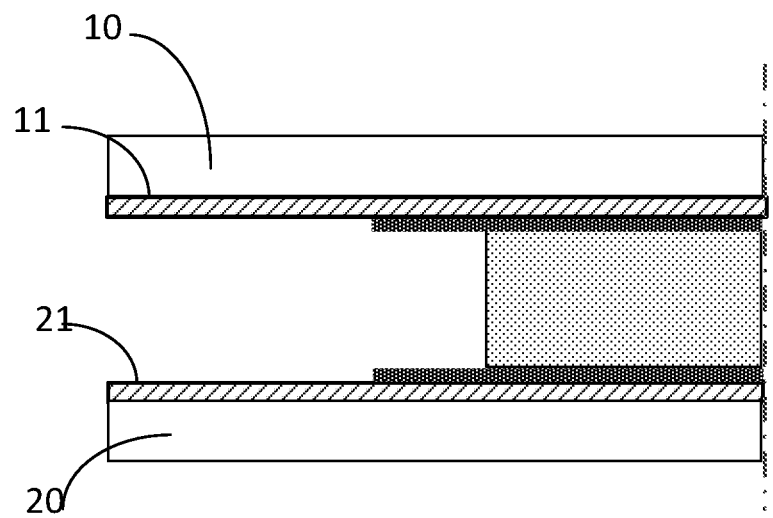
FIG. 2 is a schematic cross-sectional view of the dimming window in the related art on a circuit-binding side thereof.

FIG. 1 is a schematic perspective view of a dimming window in the related art; and FIG. 2 is a schematic cross-sectional view of the dimming window in the related art on a circuit-binding side thereof.

As shown in FIG. 1 and FIG. 2, in the related art, a dimming window in a VA mode includes a cell defined by an upper substrate 10 and a lower substrate 20, and a liquid crystal layer 30 arranged between the upper substrate 10 and the lower substrate 20. The upper substrate 10 is provided with an upper transparent conductive layer 11, and the lower substrate 20 is provided with a lower transparent conductive layer 21. The transparent conductive layers on the lower and upper substrates drive liquid crystals to be deflected to realize light-dark state conversion. For example, as shown in the figures, when the transparent conductive layers on the upper substrate 10 and the lower substrate 20 are not energized, the liquid crystals are not deflected, and at this point, the dimming window is in a transparent state: when the transparent conductive layers on the upper and lower substrates are energized, the liquid crystals are deflected, and at this point, the dimming window is in an opaque state.

As shown in FIG. 1 and FIG. 2, in the related art, since the dimming window product in a VA mode only involves two display forms of bright and dark gray scales and has no specific pixel unit, in order to adapt to a series of products with various dimensions, shapes and sizes, an entire substrate is covered with a transparent conductive film layer, without designing a mask for the transparent conductive film layer separately. With regard to the matter of bonding of a driving circuit, one method adopted in the related art is that when designing an external circuit, sizes of the first substrate 10 and the second substrate 20 are consistent, and there is no reserved pad edge; and when cutting the substrates, an avoidance hole 40 needs to be defined in the first substrate 10 and the second substrate 20, respectively, where the avoidance hole in the first substrate is used for avoiding a circuit bonding structure on the second substrate; and the avoidance hole in the second substrate is used for avoiding a circuit bonding structure on the first substrate. With such a structure, it is difficult to drill holes in the two substrates and there is no corresponding devices, thus, manual drilling is often used, which takes a long time and has a high breakage rate.

In order to solve the above-described problems, embodiments of the present disclosure provide a dimming window and a method for manufacturing the same, which can reduce process difficulty, reduce time consumption, and improve product yield.

Figure 3:
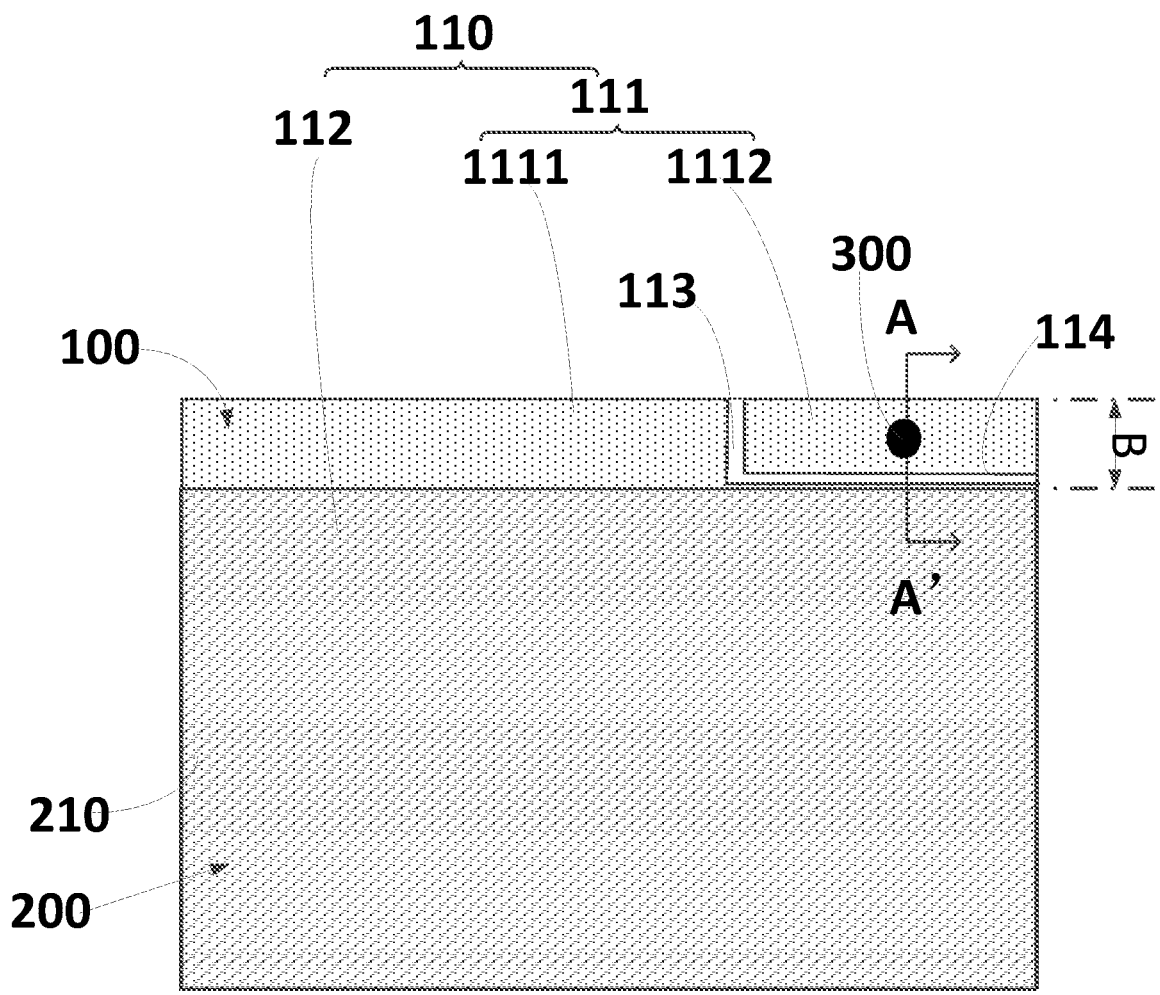
FIG. 3 is a top view of a dimming window according to an embodiment of the present disclosure, where a second substrate is positioned above a first substrate.
Figure 4:
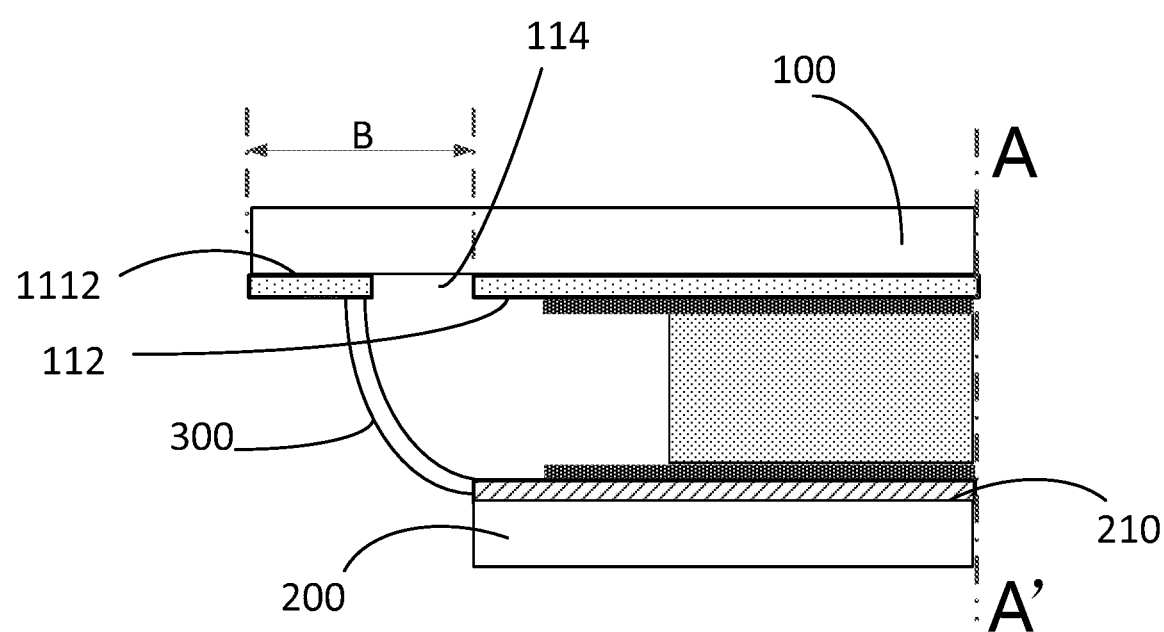
FIG. 4 is a schematic cross-sectional view of the dimming window shown in FIG. 3 taken along A-A'.

FIG. 3 is a top view of a dimming window according to an embodiment of the present disclosure; and FIG. 4 is a schematic cross-sectional view of the dimming window shown in FIG. 3 taken along A-A'.

As shown in FIG. 3 and FIG. 4, a dimming window according to an embodiment of the present disclosure includes a cell defined by a first substrate 100 and a second substrate 200, a liquid crystal layer 300 between the first substrate 100 and the second substrate 200, a first transparent conductive layer 110 on one side of the first substrate 100 facing the second substrate 200, and a second transparent conductive layer 210 one side of the second substrate 200 facing the first substrate 100. At least one side edge of the first substrate 100 exceeds the second substrate 200, and a part of the first substrate 100 that exceeds the second substrate 200 is a single substrate region B. The first transparent conductive layer 110 includes a bonding region 111 located at the single substrate region B. A pattern of the bonding region 111 includes a first sub-region 1111 and a second sub-region 1112 which are separated from each other. The first sub-region 1111 is in a binding connection with a first driving circuit which drives the first substrate 100. The second sub-region 1112 is in a binding connection with a second driving circuit which drives the second substrate 200. The second sub-region 1112 is in a conductive connection with the second transparent conductive layer 210.

In the above solution of the dimming window, a size after cutting of the first substrate 100 is designed to be greater than a size after cutting of the second substrate 200, so that at least one side edge of the first substrate 100 exceeds the second substrate 200, and is formed as the single substrate area B. The first transparent conductive layer 110 covered on one side of the first substrate 100 facing the second substrate 200 is an entire film layer covering a whole surface of the first substrate 100. A part of the first transparent conductive layer 110 covers the single substrate area B, and this part serves as the bonding area 111 for bonding and connecting a driving circuit. The bonding region 111 is patterned to be divided into a first sub-region 1111 and a second sub-region 1112 which are separated from each other. The first sub-region 1111 is connected to the first transparent conductive layer 110 and is bound and connected to the driving circuit of the first substrate 100. The second sub-region 1112 is spaced apart from the first sub-region 1111 and is bound and connected to the driving circuit of the second substrate 200. The second sub-region 1112 is in conduction with the second transparent conductive layer 210 on the second substrate 200. In this way, the two substrates can be simultaneously driven by the bonding region 111 separately provided on the first substrate 100.

It can be seen therefrom that, by the presence of the single substrate region B (i.e., a pad edge) protruding outside the second substrate 200 on at least one side of the first substrate 100, the dimming window provided in embodiments of the present disclosure can eliminate the need for drilling holes to avoid bonding circuits, thereby reducing process difficulty, reducing process time consumption and improving the product yield.

The dimming window provided in embodiments of the present disclosure is described in more details hereinafter.

In some exemplary embodiments, the first substrate 100 may be an array substrate and the second substrate 200 may be a color filter substrate. It should be understood that in practical applications, specific types of the first substrate 100 and the second substrate 200 are not limited thereto, and the first substrate 100 and the second substrate 200 may be selected according to practical requirements.

Further, in some exemplary embodiments, as shown in FIG. 3 and FIG. 4, a conductive connection is made between the second sub-region 1112 and the second transparent conductive layer 210 via a conductive adhesive 300.

In the above-mentioned solution, the purpose of conducting the second sub-region 1112 and the second transparent conductive layer 210 via the conductive adhesive 300 can be achieved by printing the conductive adhesive 300 on the second sub-region 1112 reserved on the first substrate 100, which is easy to operate and reliable in connection. It should be understood that, in practical applications, conduction between the second sub-region 1112 and the second transparent conductive layer 210 may not be limited to this, but may also be, for example, a direct connection by using a wire, or a connection by bonding solder balls or the like.

Further, in some exemplary embodiments, as shown in FIG. 3 and FIG. 4, the first transparent conductive layer 110 includes, in addition to the bonding region 111, a liquid crystal driving region 112. The liquid crystal driving region 112 is at a region completely coincident with an orthographic projection of the second transparent conductive layer 210 onto the first substrate 100. The liquid crystal driving region 112 is an entire film layer covering the first substrate 100. The first sub-region 1111 is an extension portion of the liquid crystal driving region 112 and is provided in the same layer and made of the same material as the liquid crystal driving region 112.

In the above-mentioned solution, the first sub-region 1111 is in the same layer and made of same material as the liquid crystal driving region 112. In other words, the first sub-region 1111 and the liquid crystal driving region 112 are an integral film layer. As shown in FIG. 3 and FIG. 4, the second sub-region 1112 is preferably also in the same layer and made of the same material as the first sub-region 1111. Thus, when manufacturing the first sub-region 1111 and the second sub-region 1112, first, the first substrate 100 is completely covered with a first conductive film, and then a part of the first conductive film located at the single substrate region B is patterned to form the bonding region 111 which includes the first sub-region 1111 and the second sub-region 1112. In this way, the process can be simplified and performed with existing devices in factories, thereby improving efficiency without the need for additional manual work.

It should be noted that, in practical applications, the first sub-region 1111 and the second sub-region 1112 may also be arranged in different layers and/or made of different materials from the liquid crystal driving region 112.

Further, as an exemplary embodiment, as shown in FIG. 3 and FIG. 4, the pattern of the bonding region 111 further includes a first separation line 113 between the second sub-region 1112 and the first sub-region 1111, and a second separation line 114 between the second sub-region 1112 and the liquid crystal driving region 112.

With the above-mentioned solution, the second sub-region 1112 needs to be separated from the first sub-region 1111 and the liquid crystal driving region 112 to avoid signal interference. As shown in FIG. 3 and FIG. 4, the second sub-region 1112 and the first sub-region 1111 can be separated by the first separation line 113, and the second sub-region 1112 and the liquid crystal driving region 112 can be separated by the second separation line 114. For example, as shown in FIG. 3 and FIG. 4, the first separation line 113 and the second separation line 114 are perpendicular to each other.

It should be understood that a separation pattern in the bonding region 111 for separating the second sub-region 1112 from the first sub-region 1111 and the liquid crystal driving region 112, is not limited to a pattern of separation line, but may have other shapes, and specific directions of the first separation line 113 and the second separation line 114 are not limited to a state of being perpendicular to each other.

For example, as an exemplary embodiment, the bonding region 111 is divided into the first sub-region 1111 and the second sub-region 1112 by the first separation line 113 and the second separation line 114; and the first sub-region 1111 and the second sub-region 1112 are distributed at opposite sides, and orthographic projections of the first sub-region 1111 and the second sub-region 1112 onto the first substrate 100 are rectangular or elongated. It is of course to be understood that the specific shapes of the orthographic projections of the first sub-region 1111 and the second sub-region 1112 onto the first substrate 100 are not limited to this, but may also be other shapes, for example trapezoid, etc. The first separation line 113 and the second separation line 114 may not be limited to a straight line, but may be an arc line or the like.

Further, as an exemplary embodiment, the first separation line 113 and the second separation line 114 are both laser-etched lines. That is, the first separation line 113 and the second separation line 114 are formed by a laser etching process, which has advantages of process simplicity compared to other etching processes. It is of course to be understood that the specific etching manner for the first separation line 113 and the second separation line 114 is not limited thereto.

Further, as shown in FIG. 3 and FIG. 4, the dimming window further includes a sealant located between the first substrate 100 and the second substrate 200. The sealant surrounds an outer periphery of the liquid crystal layer 300. The bonding region 111 is located at an outer side of the sealant which is away from the liquid crystal layer 300.

Further, the liquid crystal layer 300 includes dye liquid crystals. In particular, the liquid crystal layer 300 may be dye liquid crystal containing chiral agent. The specific material selected for the liquid crystal layer 300 is not limited herein.

One embodiment of the present disclosure further provides a method for manufacturing the dimming window provided in embodiments of the present disclosure. The method including the following steps.

Step S01: manufacturing a first substrate 100; where at least one side edge of the first substrate 100 exceeds a second substrate 200 to form a single substrate region B, a first transparent conductive layer 110 is formed on one side of the first substrate 100 facing the second substrate 200, the first transparent conductive layer 110 includes a bonding region 111 located at the single substrate region B, and a pattern of the bonding region 111 includes a first sub-region 1111 and a second sub-region 1112 which are separated from each other; the first sub-region 1111 is in a binding connection with a first driving circuit for driving the first substrate 100, and the second sub-region 1112 is in a binding connection with a second driving circuit for driving the second substrate 200.

Step S02: manufacturing a second substrate 200; where a second transparent conductive layer 210 is formed on one side of the second substrate 200 facing the first substrate 100.

Step S03: assembling the first substrate 100 and the second substrate 200 to define a cell, where a conductive connection is made between the second sub-region 1112 and the second transparent conductive layer 210.

In the above-mentioned solution of the dimming window, a size after cutting of the first substrate 100 is designed to be greater than a size after cutting of the second substrate 200, so that at least one side edge of the first substrate 100 exceeds the second substrate 200, and is formed as the single substrate area B. The first transparent conductive layer 110 covered on one side of the first substrate 100 facing the second substrate 200 is an entire film layer covering a whole surface of the first substrate 100. A part of the first transparent conductive layer 110 covers the single substrate area B, and this part serves as the bonding area 111 for bonding and connecting a driving circuit. The bonding region 111 is patterned to be divided into a first sub-region 1111 and a second sub-region 1112 which are separated from each other. The first sub-region 1111 is connected to the first transparent conductive layer 110 and is bound and connected to the driving circuit of the first substrate 100. The second sub-region 1112 is spaced apart from the first sub-region 1111 and is bound and connected to the driving circuit of the second substrate 200. The second sub-region 1112 is in conduction with the second transparent conductive layer 210 on the second substrate 200. In this way, the two substrates can be simultaneously driven by the bonding region 111 separately provided on the first substrate 100.

As an exemplary embodiment, the step S01 of the method specifically includes the following steps:

Step S011: obtaining a first base substrate of the first substrate 100 via cutting, where the first base substrate has the single substrate region B that exceeds beyond the second substrate 200;

Step S012: forming a first conductive film on the first substrate 100; and

Step S013: patterning the first conductive film to form the first transparent conductive layer 110.

For example, the step S013 specifically includes: patterning the first conductive film by means of laser etching.

In the above-mentioned solution, using a laser etching process to etch the first conductive film has the advantages of high etching precision and easy operation compared with other patterning methods.

Further, as an exemplary embodiment, the step S03 specifically includes:

printing conductive adhesive 300 on the second sub-region 1112 on the first substrate 100, so that a conductive connection is made between the second sub-region 1112 and the second transparent conductive layer 210 via the conductive adhesive 300.

It is of course to be understood that, in practice, the second sub-region 1112 may be conductive to the second transparent conductive layer 210 in other ways, for example, bonding by solder balls or connecting by wires.

The following points need to be explained:
(1) The drawings relate only to the structures to which the embodiments of the present disclosure relate, and other structures may refer to general designs.
(2) In the drawings used to describe embodiments of the present disclosure, the thickness of layers or regions is enlarged or reduced for clarity, i.e., the drawings are not to scale. It will be understood that when an element such as a layer, film, region or substrate is referred to as being "on" or "under" another element, it can be "directly on" or "directly under" the other element or intervening elements may be present.
(3) Without conflict, embodiments of the present disclosure and features of the embodiments may be combined with each other to provide new embodiments.

The foregoing is mere embodiments of the present disclosure, the scope of protection of this disclosure is not limited to this, and the scope thereof is defined by the appended claims.

What is claimed is:

1. A dimming window, comprising:
a cell defined by a first substrate and a second substrate, wherein at least one side edge of the first substrate exceeds an outside of the second substrate, and a part of the first substrate that exceeds the second substrate serves as a single substrate region;
a first transparent conductive layer on one side of the first substrate facing the second substrate; wherein the first transparent conductive layer includes a liquid crystal driving region;
a second transparent conductive layer on one side of the second substrate facing the first substrate; and
a liquid crystal layer between the first substrate and the second substrate;
wherein the first transparent conductive layer includes a bonding region at the single substrate region; and a pattern of the bonding region includes a first sub-region and a second sub-region which are separated from each other;
the first sub-region is in a binding connection with a first driving circuit which drives the first substrate, and the second sub-region is in a binding connection with a second driving circuit which drives the second substrate; and
the second sub-region is in conductive connection with the second transparent conductive layer;
wherein the pattern of the bonding region further includes a first separation line between the second sub-region and the first sub-region, and a second separation line between the second sub-region and the liquid crystal driving region;
wherein the first separation line and the second separation line are perpendicular to each other.

2. The dimming window according to claim 1, wherein the first substrate is an array substrate, and the second substrate is a color filter substrate.

3. The dimming window according to claim 1, wherein the second sub-region is in conductive connection with the second transparent conductive layer via conductive adhesive.

4. The dimming window according to claim 1, wherein the liquid crystal driving region is at a region completely coincident with an orthographic projection of the second transparent conductive layer onto the first substrate; the liquid crystal driving region is an entire film layer covering the first substrate; and the first sub-region is an extension portion of the liquid crystal driving region and is in the same layer and made of the same material as the liquid crystal driving region.

5. The dimming window according to claim 1, wherein the first separation line and the second separation line are both laser etching lines.

6. The dimming window according to claim 1, wherein the dimming window further includes a sealant between the first substrate and the second substrate; the sealant surrounds an outer periphery of the liquid crystal layer; and the bonding region is located at an outer side of the sealant away from the liquid crystal layer.

7. The dimming window according to claim 1, wherein the liquid crystal layer includes dye liquid crystal.

8. A method for manufacturing the dimming window according to claim 1, comprising:
manufacturing a first substrate; wherein at least one side edge of the first substrate exceeds a second substrate to form a single substrate region, a first transparent conductive layer is formed on one side of the first substrate facing the second substrate, the first transparent conductive layer includes a bonding region located at the single substrate region, and a pattern of the bonding region includes a first sub-region and a second sub-region which are separated from each other; the first sub-region is in a binding connection with a first driving circuit for driving the first substrate, and the second sub-region is in a binding connection with a second driving circuit for driving the second substrate;
manufacturing the second substrate; wherein a second transparent conductive layer is formed on one side of the second substrate facing the first substrate;
assembling the first substrate and the second substrate to define a cell with the second sub-region in conductive connection with the second transparent conductive layer.

9. The method according to claim 8, wherein the manufacturing the first substrate, includes:
obtaining a first base substrate of the first substrate via cutting, wherein the first base substrate has the single substrate region that exceeds beyond the second substrate;
forming a first conductive film on the first substrate; and
patterning the first conductive film to form the first transparent conductive layer.

10. The method according to claim 9, wherein the patterning the first conductive film to form the first transparent conductive layer, includes:
patterning the first conductive film via laser etching.

11. The method according to claim 8, wherein the assembling the first substrate and the second substrate to define the cell with the second sub-region in conductive connection with the second transparent conductive layer, includes:
printing conductive adhesive on the second sub-region on the first substrate, so that the second sub-region is in conductive connection with the second transparent conductive layer via the conductive adhesive.

12. The dimming window according to claim 1, wherein an orthographic projection of each of the first sub-region and the second sub-region onto the first substrate is rectangular or elongated.

13. The dimming window according to claim 1, wherein the first separation line intersects the second separation line.

14. The dimming window according to claim 1, wherein second sub-region is located at an end of the single substrate region away from the liquid crystal driving region.

* * * * *